United States Patent [19]

Kosaka et al.

[11] Patent Number: 5,751,898

[45] Date of Patent: May 12, 1998

[54] SPEECH RECOGNITION METHOD AND APPARATUS FOR USE THEREIN

[75] Inventors: Tetsuo Kosaka; Atsushi Sakurai, both of Yokohama; Junichi Tamura, Tokyo, all of Japan

[73] Assignee: Canon Kabushiki Kaisha, Tokyo, Japan

[21] Appl. No.: 199,968

[22] Filed: Feb. 22, 1994

Related U.S. Application Data

[63] Continuation of Ser. No. 48,060, Apr. 19, 1993, abandoned, which is a continuation of Ser. No. 592,304, Oct. 2, 1990, abandoned.

[30] Foreign Application Priority Data

Oct. 3, 1989 [JP] Japan .................................... 1-259649

[51] Int. Cl.$^6$ ........................................................ G10L 5/06
[52] U.S. Cl. ........................................ 395/2.5; 395/2.47
[58] Field of Search .............................. 381/41–45; 395/2, 395/2.45, 2.47, 2.5

[56] References Cited

U.S. PATENT DOCUMENTS

| | | | |
|---|---|---|---|
| Re. 31,188 | 3/1983 | Pirz et al. | 381/43 |
| 4,181,821 | 1/1980 | Pirz et al. | 381/43 |
| 4,592,085 | 5/1986 | Watari et al. | 381/43 |
| 4,707,858 | 11/1987 | Fette | 381/43 |

OTHER PUBLICATIONS

"Isolated Words Recognition Using DP Matching And Mahalanobis Distance", Denshi Tsushin Gakkai Ronbunshi, vol. J66–A, No. 1 (Jan. 1983), pp. 64–70.

Rabiner, et al., "On the Performance of Isolated Word Speech Recognizers Using Vector Quantization and Temporal Energy Contours," AT&T Bell Laboratories Technical Journal, vol. 63(1984) Sep., No. 7, pp. 1245–1260.

Boyer, et al., "Dynamic Time Warping and Vector Quantization in Isolated and Connected Word Recognition," European Conference on Speech Technology, vol. 2, Sep. 1987, pp. 436–439.

Niyada, et al., "Consonant Recognition Methods for Unspecified Speakers Using BPF Powers and Time Sequence of LPC Cepstrum Coefficients," Systems and Computers in Japan, vol. 18, No. 6, Jun. 1987, pp. 47–59.

Kitazume, et al., "LSI Implementation of a Pattern Matching Algorithm for Speech Recognition," IEEE Transactions on Acoustics, Speech, and Signal Processing, vol. ASSP-33, No. 1, Feb. 1985, pp. 1–4.

Kimura, et al., "A Telephone Speech Recognition System Using Word Spotting Technique Based on Statistical Measure," Proceedings: ICASSP '87, 1987 International Conference on Acoustics, Speech, and Signal Processing, vol. 2 of 4, Apr. 6–9, 1987, Dallas, Texas, pp. 1175–1178.

Nakagawa, "A Connected Spoken Word Recognition Method by O(n) Dynamic Programming Pattern Matching Algorithm," ICASSP '83 Proceedings, IEEE International Conference on Acoustics, Speech, and Signal Processing, vol. 1 of 3, Apr. 14–16, 1983, Boston, Massachusetts, pp. 296–299.

(List continued on next page.)

Primary Examiner—David D. Knepper
Attorney, Agent, or Firm—Fitzpatrick, Cella, Harper & Scinto

[57] ABSTRACT

Speech recognition is achieved using a normalized cumulative distance. A normalized Dynamic Programming (DP) value is calculated by dividing a cumulative path distance by an optimal integral path length. The path length is calculated iteratively by adding 2 if the warping path is diagonal or by adding 3 if the warping path is horizontal or vertical. Distance may be calculated by measuring a difference between input power and average power. The power difference is weighted by a coefficient ($\lambda$) between 0 and 1. A Mahalanobis distance is then weighted by ($1-\lambda$) and added to the weighted power difference.

15 Claims, 5 Drawing Sheets

OTHER PUBLICATIONS

Silverman, et al., "An Early–Decision, Real–Time, Connected–Speech Recognizer," Proceedings: ICASSP '87, International Conference on Acoustics, Speech, and Signal Processing, vol. 1 of 4, Apr. 6–9, 1987, Dallas, Texas, pp. 97–100.

Kawabata, et al., "Automatic Organization of Word Spotting Reference Patterns," Review of the Electrical Communications Laboratories, vol. 35, No. 6, 1987, pp. 681–686, 1987.

Davis, et al., "Comparison of Parametric Representations for Monosyllabic Word Recognition in Continuously Spoken Sentences," IEEE Transactions of Acoustics, Speech, and Signal Processing, vol. ASSP–28, No. 4, Aug. 1980, pp. 357–366.

Sakoe et al., "Dynamic Programming Algorithm Optimization for Spoken Word Recognition", IEEE Trans of ASSP, vol. ASSP–26, No. 1, Feb. 1978, pp. 43–49.

Rabiner, "Speaker–Independent Recognition of Isolated Words Using Clustering Techniques," IEEE Trans. on ASSP, vol. ASSP–27, No. 4, Aug. 1979, pp. 336–349.

SPEECH RECOGNITION METHOD AND APPARATUS FOR USE THEREIN

This application is a continuation of application Ser. No. 08/048,060 filed Apr. 19, 1993, now abandoned, which is a continuation of application Ser. No. 07/592,304 filed Oct. 2, 1990, now abandoned.

BACKGROUND OF THE INVENTION

1. Field of the Invention

The present invention relates to a speech recognition method and to a speech recognition apparatus using the word spotting method which simultaneously detects and recognizes words from speech.

2. Description of the Prior Art

Although devices which recognize a limited vocabulary of a specific speaker have already entered practical use, the recognition of the speech of unspecified speakers is not being performed precisely enough by currently available devices. If speech recognition of unspecified speakers becomes possible, it will be applicable to a wide range of speech, for example, to the recognition of telephone speech. Therefore, whether or not a speech recognition apparatus can be used with unspecified speakers is important.

Conventionally, in order to perform speech recognition intended for unspecified speakers, the following suggestions have been offered:

(1) prepare a plurality of reference patterns for one category;

(2) regularize the spectrum; or (3) use an average reference pattern.

As for suggestion (3), the Dynamic Programming (DP) matching method with high precision, which uses the Maharanobis distance of the feature parameter, is suggested. The method is mentioned in detail in "Word Speech Recognition by DP Matching Using Mahalanobis Distance", *Denshi Tsushin Gakkai Ronbunshi*, Vol.J66-A No.1 (January 1983), pp. 64–70. Although it is possible to form a recognition apparatus suitable for unspecified speakers by using such a method, for example, in the case of telephone speech recognition, the recognition environment thereof is noisy, unlike that in a soundproof room without any noise, and causes an incorrect recognition to accompany an incorrect detection of the speech section. Since the above Mahalanobis DP method recognizes the word after selecting the speech section, it has the disadvantage of conducting an incorrect recognition if an incorrect selection is caused by noise.

SUMMARY OF THE INVENTION

It is an object of the present invention to provide an apparatus and method for recognizing speech which correctly detects the speech section of inputted auditory information inputted into a speech recognition apparatus.

It is another object of the present invention to provide a speech recognition apparatus and method which can simultaneously detect a speech section of inputted information and recognize the speech.

It is still another object of the present invention to overcome the disadvantages of the prior art.

To accomplish these objects, the present invention, according to one aspect, relates to a speech recognition apparatus comprising input means for inputting a spoken word, memory means for storing data representing a standard pattern of a word composed of an average vector and a matrix including covariance elements, shift means for shifting the data representing the standard pattern, calculation means for calculating a plurality of Mahalanobis distances between the data representing a time series of parameters of the spoken word input by the input means and a plurality of data representing the shifting standard pattern stored in the memory means, retention means for retaining data representing the plurality of Mahalanobis distances together with the data representing the standard patterns used by the calculation means for the calculations, detection means for detecting data representing the minimum Mahalanobis distance retained in the retention means, and recognition means for recognizing whether the input spoken word is the word represented by the standard pattern based on the data representing the minimum Maharanobis distance retained by the retention means and detected by the detection means. The calculation means can calculate each of the plurality of distances by using a measure of the power of the inputted spoken word, the average vector of the inputted spoken word, and variance/covariance matrix of the inputted spoken word. The apparatus can also include means for converting the input spoken word into data representing a time series of parameters of the input spoken word.

In one embodiment, the recognition means can comprise calculation means for calculating a plurality of dynamic programming values of the inputted spoken word over time while the shift means shifts the standard pattern, determining means for determining whether one of the plurality of dynamic programming values is below a predetermined threshold value, and means for recognizing the inputted spoken word as the word represented by the standard pattern when the determining means determines that one of the plurality of dynamic programming values is below the predetermined threshold value. The apparatus can further include means for setting this predetermined threshold value.

According to another aspect, the present invention relates to a method for recognizing speech comprising the steps of converting a spoken word into data representing a time series of parameters, calculating a plurality of Mahalanobis distances between the data representing the time series of parameters and data representing a shifting standard pattern of a spoken word comprising an average vector and a variance/covariance matrix, determining the minimum Mahalanobis distance, and recognizing whether the spoken word converted in the converting step is the word represented by the standard pattern based on the minimum Maharanobis distance detected in the detecting step.

The recognizing step can comprise the steps of calculating a plurality of dynamic processing values over time of the spoken word converted in the converting step using the shifting standard pattern, determining whether one of the plurality of dynamic programming values is below a predetermined threshold value, and recognizing the spoken word converted in the converting step as the word represented by the standard pattern when one of the plurality of dynamic programming values is determined in the determining step to be below the predetermined threshold value. The method can also comprise the additional step of setting the predetermined threshold value. In addition, the calculation step can comprise the step of calculating each of the plurality of distances using a measure of the power of the spoken word converted in the converting step, the average vector of the spoken word converted in the converting step, and a variance/covariance matrix of the spoken word converted in the converting step.

DESCRIPTION OF THE PREFERRED EMBODIMENTS

[Explanation of Principle of Operations]

The connected DP (Dynamic Programming) matching method using the Mahalanobis distance uses an average vector and a variance/covariance matrix as a reference pattern. The reference pattern is not found by analyzing one item of speech as found in a normal DP matching method, but by learning the average vector and the variance/covariance matrix.

The learning operation is performed for each word as follows. In the following description, all of the speech data to be used is converted to LPC cepstrums or a time series of speech parameters.

A word which is average in time and spectrum is selected as a kernel word from a plurality of identical words. The selected word is called a kernel pattern. Then, the DP matching is conducted between the kernel pattern and the time series of the speech parameters of the identical words so as to determine a frame of a speech pattern input as a sample of a standard pattern corresponding to each frame of the kernel pattern. Much data of the frame corresponding to each frame of the kernel pattern is selected by using many identical words, and the average vector and the variance/covariance matrix are found from the data.

The average vector and the variance/covariance matrix are respectively calculated as follows:

(1) Average Vector $$\overline{X_l} = \frac{1}{n} \sum_{k=1}^{n} X_l(n) \tag{1}$$

$X_l^{(k)}$: lth frame data of Kth input speech vector X $\overline{X_l}$: average value of lth frame data of input speech vector X (2) Matrix including covariance elements $$s_{lm} = \frac{1}{n} \sum_{k=1}^{n} (x_l^{(k)} - \overline{X_l})(x_m^{(k)} - \overline{X_m})$$

$$= \frac{1}{n} \sum_{k=1}^{n} x_l^{(k)} X_m^{(k)} - \overline{X_l}\overline{X_m}$$

By using the average vector and the matrix thus found, the word is recognized as follows:

(1) Cumulative Distance $$P(i,j) = \min \begin{array}{l} P(i-2,j-1) + 2d(i-1,j) + d(i,j) \ (a) \\ P(i-1,j-1) + 2d(i,j) \ (b) \\ P(i-1,j-2) + 2d(i,j-1) + d(i,j) \ (c) \end{array} \tag{3}$$

i: i frame of input speech vector j: j frame of standard pattern d(i,j): distance between i and j (2) Optimal Integral Path Length $$C(i,j) = \begin{array}{l} C(i-2,j-1) + 3 \ \text{if}(a) \\ C(i-1,j-1) + 2 \ \text{if}(b) \\ C(i-1,j-2) + 3 \ \text{if}(c) \end{array} \tag{4}$$

(3) Distance $$d(i,j) = (Xi - \overline{Xj}) \, Sj^{-1} \, (Xi - \overline{Xj})' \tag{5}$$

Xi: input vector in i frame $\overline{Xj}$: average vector in j frame

Sj: matrix in j frame (4) DP Value $$D(i) = \frac{P(i,j)}{C(i,j)} \tag{6}$$

j: standard pattern length

By calculating D(i) of each word while shifting the standard pattern by one frame, it can be found that, when the word n is ended, the value D(i) of the word is reduced. The word section can be found from the reduction of the value D(i) and it is recognized that the standard pattern at that time is identical with the word of the speech. Therefore, it is possible to set a certain threshold value for the DP value, set the point, where the DP value becomes lower than the threshold value, as the recognition point, and simultaneously select and recognize the word.

[Specific Description according to Composition Views]

Figure 1:
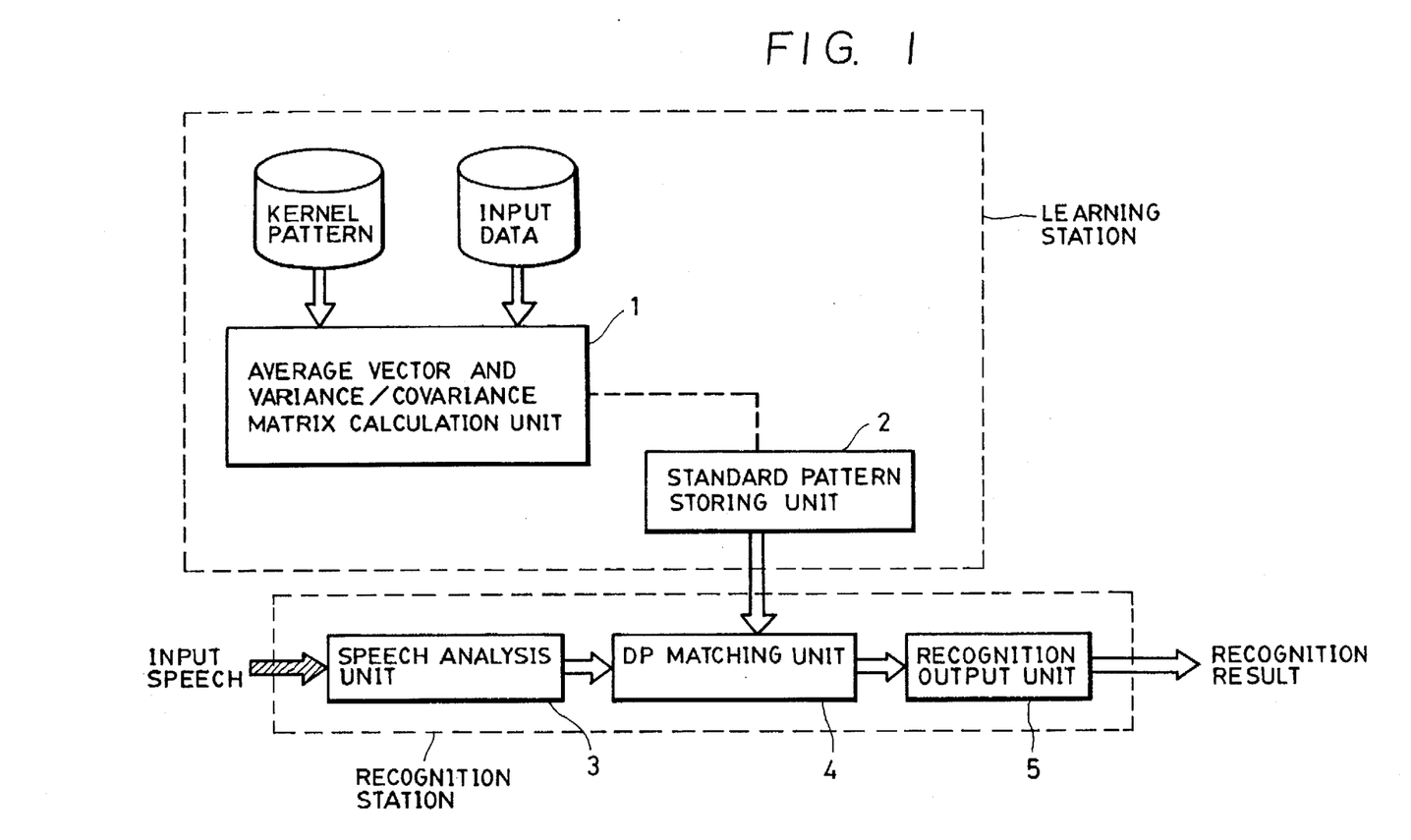
FIG. 1 is a view showing the composition of the present invention.

FIG. 1 shows the composition of a recognition apparatus of the present invention. A recognition station is only used in an actual recognition operation, while a learning station is used in designing a standard pattern.

Referring to FIG. 1, the recognition apparatus is constituted by an average vector and matrix calculation unit 1 for calculating an average vector and a matrix including covariance elements, a standard pattern storing unit 2 for storing a plurality of standard patterns composed of the average vector and the matrix, a speech analysis unit 3 for analyzing input speech and converting the speech into parameters, a Dynamic Programming (DP) matching unit 4 for executing Dynamic Programming (DP) by using the standard pattern stored in the standard pattern storing unit 2 so as to calculate points (the Mahalanobis distance between the input word and the standard pattern), and a recognition output unit 5 for determining and outputting the recognized word by using the result of the DP executed in the Dynamic Programming (DP) matching unit 4.

Figure 2:
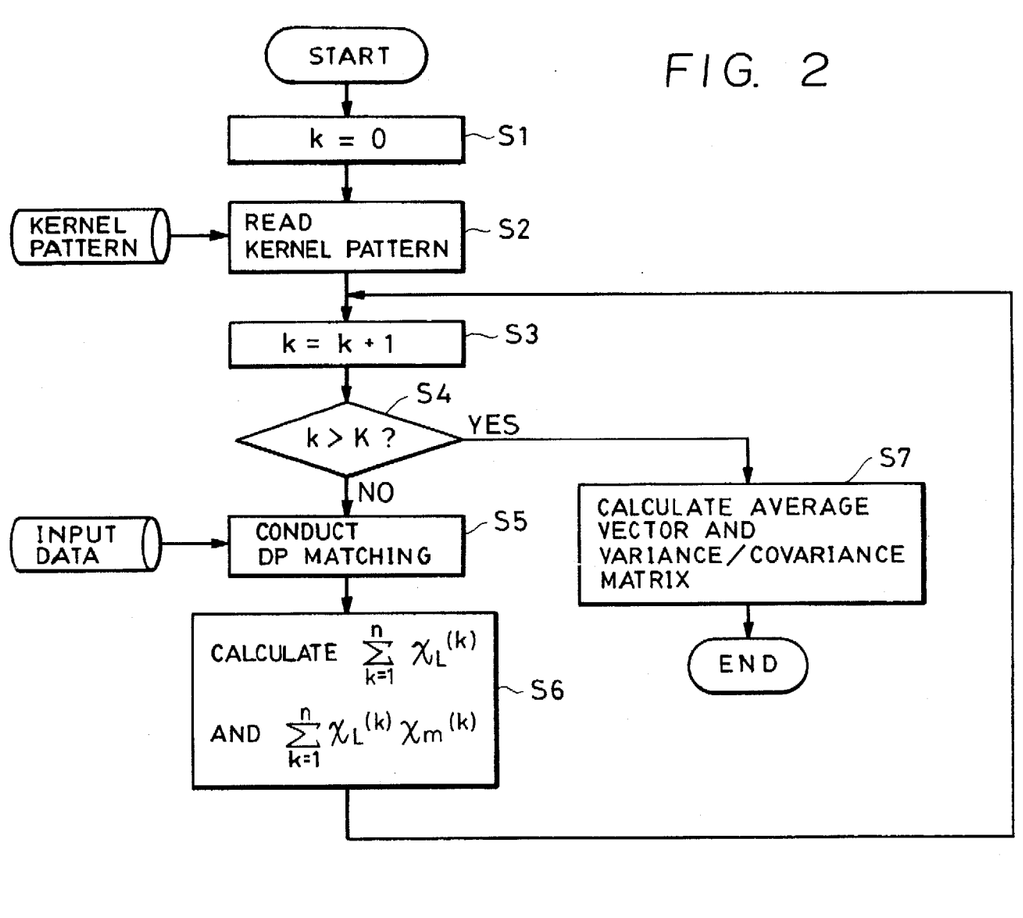
FIG. 2 is a flowchart for designing a standard pattern.

In the average vector and matrix calculation unit 1, a central processing unit (CPU) makes a calculation according to the flowchart shown in FIG. 2. Since FIG. 2 shows the calculation of the average vector and the matrix of one word, it is possible to obtain all the standard patterns for a number of recognition object words by repeating the calculation the number of times corresponding to the number of recognition object words.

The variable k for counting the repetition is cleared in S1, and speech data such as a kernel pattern is read in S2. The variable k is increased in S3, and in S4 it is determined whether or not the repetition counter k has reached a predetermined number K. When the number of recognition object words is K and k is lower than K, the calculation proceeds to S5. The DP matching is performed between the input data and the kernel pattern, and data corresponding to each frame of the kernel pattern is determined in S5. Based on the data, the following calculations are made in S6:

$$\sum_{k=1}^{n} X_j^{(k)} \text{ and } \sum_{k=1}^{n} X_j^{(k)} X_m^{(k)}$$

The above calculations are repeated while reading the data one after another until k reaches K. When k is higher than K, the average vector and the matrix are calculated by using the equations (1) and (2) in S7. Since the learning operation is thus completed, the calculated average vector and matrix are stored in the standard pattern storing unit 2 shown in FIG. 1.

[Recognition Station]

The recognition station will be described with reference to FIGS. 1, 3 and 6.

The speech input from a microphone 200 as a recognition object passes a low-pass filter 201, is converted from analog data to digital data by an A/D converter 202, passes an interface 203 and is transmitted to a speech analysis apparatus. Subsequent processes of the recognition station are performed in a central processing unit (CPU) 205. However, the standard pattern is stored in a memory 204, and the DP value calculated from the input speech and the standard pattern is also stored in the memory 204 in correspondence with information representing the word of the standard pattern, for example, address information, code information and so on.

The speech analysis unit 3 converts the input speech as the recognition object into an electrical signal whose parameters are suitable for speech recognition, for example, LPC cepstrums. In the DP matching unit 4, the DP value of the time series of the speech parameters of the input speech and the standard pattern stored in the standard pattern storing unit 4 is calculated by the method shown in the equations (3), (4), (5) and (6). The recognition output unit 5 determines the recognition word based on the DP value found in the DP matching unit 4 and outputs the recognition result.

Figure 3:
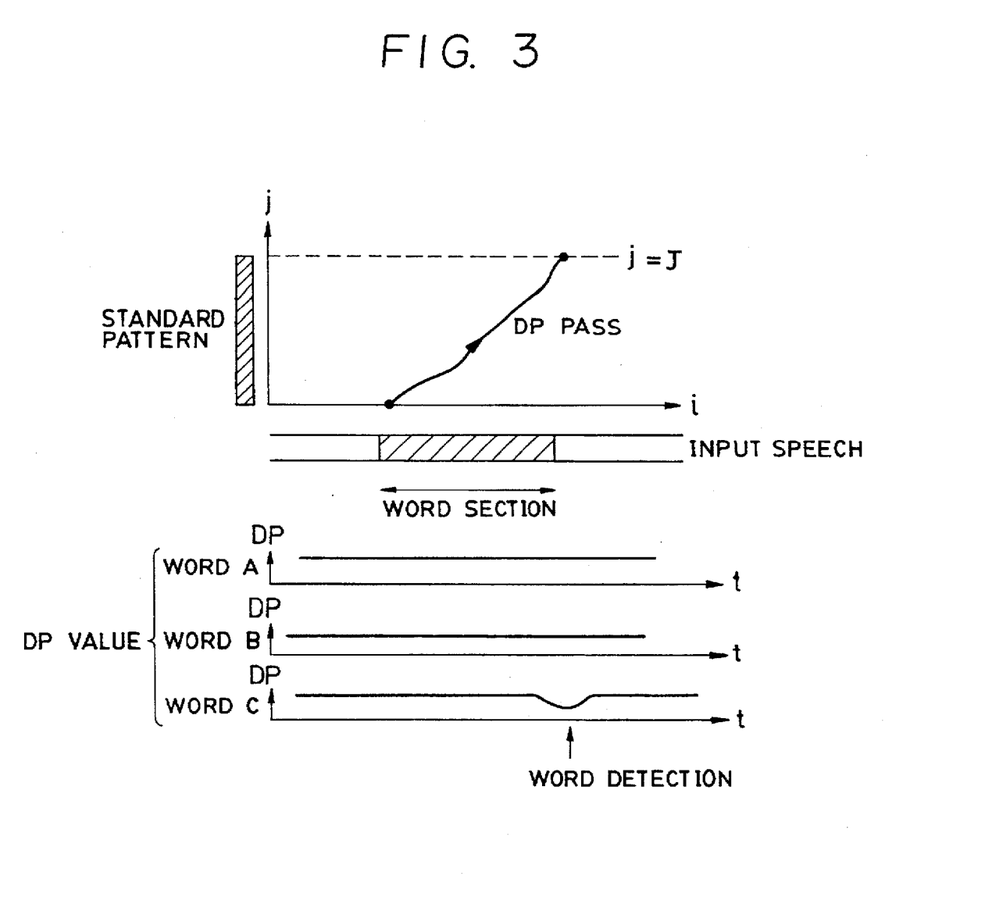
FIG. 3 is an explanatory view of a word detection method.

Referring to FIG. 3, i shows the time axis of the input speech and j shows the time axis of the standard pattern. When there are three kinds, A, B and C, of recognition object words, the DP value is calculated for each word. If the word C is input, the DP value is decreased near the time when the word speech is completed. Therefore, the word section is detected from the time when a value lower than a predetermined proper threshold value appears, and the word is determined from the value representing the standard pattern stored in the memory corresponding to the DP value and output as the recognition result by, for example, a display. Alternatively, the recognition result can be output as a voice waveform. This is accomplished by transmitting the recognition result from the CPU 205 to the interface 203, a digital-to-analog circuit 209, a low-pass filter 210, an amplifier 211, and a speaker 212, which outputs the recognition result as a voice waveform output.

Figure 4:
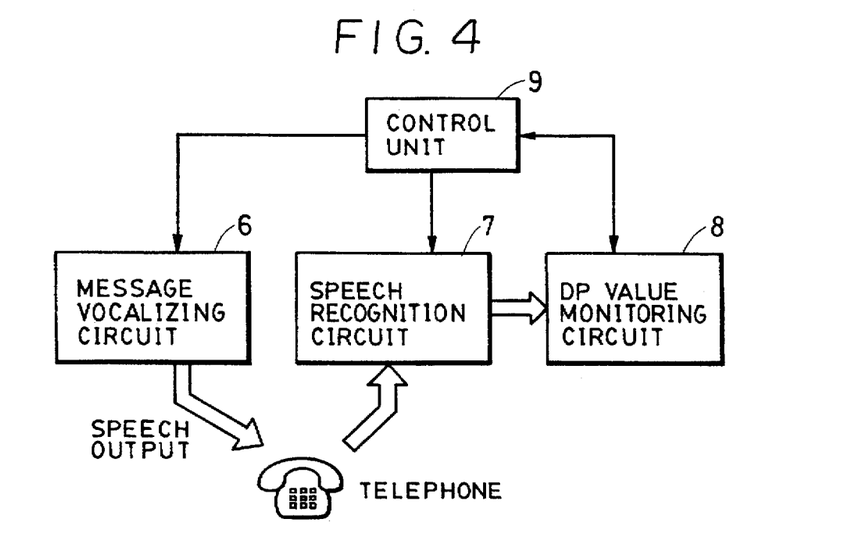
FIG. 4 is a view showing the composition of the present invention applied to a telephone speech recognition.
Figure 5:
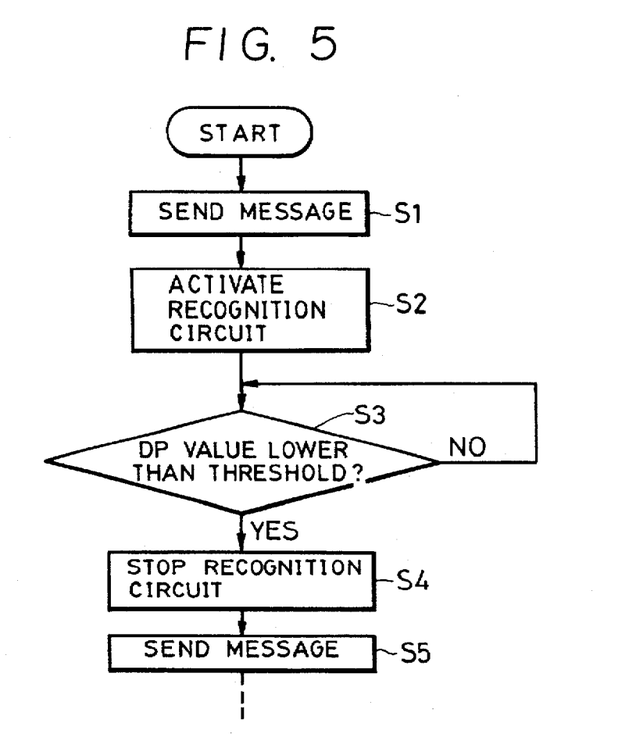
FIG. 5 is a flowchart of operations of the apparatus shown in FIG. 4.

FIG. 4 shows an embodiment in which the above recognition apparatus is used for telephone speech recognition. FIG. 4 shows one such embodiment. The recognition apparatus is constituted by a message vocalizing circuit 6 of a speech synthesis apparatus, the above-mentioned speech recognition circuit 7, a DP value monitoring circuit 8 for monitoring the DP value and sending a signal when the DP value becomes lower than the threshold value to a control unit 9 for controlling the whole recognition apparatus. The operations of the control unit 9 of the apparatus shown in FIG. 4 will be described according to the flowchart shown in FIG. 5. A message for guidance is sent to a telephone by the message vocalizing circuit 6 in S1. In S2, after a shrill confirmation sound is given, the speech recognition circuit 7 is activated. Since the DP value for each word is found and output by the speech recognition circuit 7, the DP value monitoring circuit 8 monitors the output value. As shown in S3, if the DP value is not lower than the threshold value, the recognition operation is continued, and if the DP value becomes lower than the threshold value, a signal is sent to the control unit 9, the operation of the recognition circuit 7 is stopped in response to another shrill confirmation sound which shows that the speech has been recognized, and a reply is made to the recognition by, for example, outputting speech with the message vocalizing circuit. By repeating the above process several times, speech is exchanged with a speaker using the telephone.

[Another Embodiment]

In the above embodiment, the distance measure taking into account the power of the input speech may be used. In this case, the following equation can be substituted for the equation (5):

$$d(i,j) = \lambda |y_i - \overline{y_j}| + (1-\lambda)(X_i - \overline{X_j}) \quad (7)$$
$$S_j^{-1}(X_i - \overline{X_j})^t$$

$\lambda$: weight coefficient (0.0–1.0)
$y_i$: power of input speech in i frame
$\overline{y_j}$: average power in j frame As described above, since the power is considered to some extent when the spotting is performed, even if the parameter which is used is unlikely to reflect the power, for example as with the LPC cepstrum, the efficiency of the spotting is still enhanced.

Figure 6:
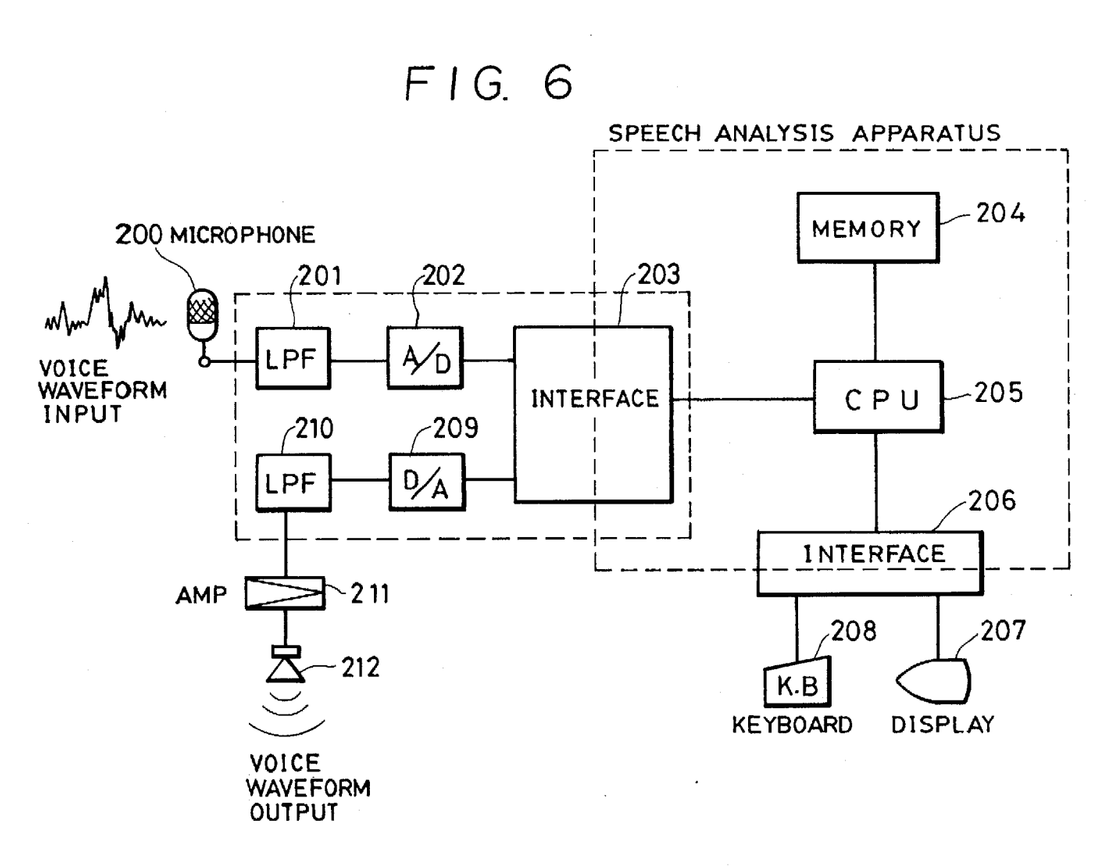
FIG. 6 is a view showing the composition of a speech input and output apparatus.

The individual components represented by the blocks shown in FIGS. 1, 4, and 6 are all well known in the voice recognition art in their specific construction and operation is not critical to the operation or best mode for carrying out the invention. Moreover, the steps illustrated in FIGS. 2 and 5 can be easily programmed into well known central processing units by persons of ordinary skill and since such programming per se is not part of this invention, no further description thereof is deemed necessary.

What is claimed is:

1. A speech recognition apparatus, comprising:

input means for inputting a speech vector;

memory means for storing data representing a reference pattern of a word composed of an average vector and a matrix including covariance elements obtained by learning some input speech vector of the word;

calculation means for calculating the cumulative distance P(i,j) between the $i^{th}$ frame of an input speech vector and the jth frame of the reference pattern, for calculating the optimal integral path length C(i,j) between the $i^{th}$ frame of the input speech vector and the jth frame of the reference pattern, and for calculating a dynamic programming value D(i) for the $i^{th}$ frame of an input speech vector according to the equation D(i)=P(i,j)/C(i,j);

calculation means for calculating sequentially the Mahalanobis distance between data representing a time series of parameters of the speech vector input by said input means and data representing the reference pattern of the word composed of the average vector and the matrix including covariance elements stored in said memory means by performing a matching operation by means of a connected dynamic programming method;

detection means for detecting the reference pattern representing the minimum Mahalanobis distance calculated by said calculation means; and recognition means for recognizing when the end of a word has been input by determining that D(i) has fallen below a predetermined threshold and for recognizing whether the input speech vector is the word represented by the reference pattern based on the data representing the minimum Mahalanobis distance calculated by said calculation means and detected by said detection means when D(i) falls below the predetermined threshold.

2. A speech recognition apparatus according to claim 1, wherein said calculation means calculates each of the plurality of distances by using a measure of the power of the inputted spoken word, the average vector of the inputted spoken word, and the matrix of the inputted spoken word.

3. A speech recognition apparatus according to claim 1, further comprising means for converting the input spoken word into data representing a time series of parameters of the input spoken word.

4. A speech recognition apparatus according to claim 1, wherein said recognition means comprises:

calculation means for calculating a plurality of dynamic programming values of the inputted spoken word over time while said shift means shifts the standard pattern;

determining means for determining whether one of said plurality of dynamic programming values is below a predetermined threshold value; and means for recognizing the inputted spoken word as the word represented by the standard pattern when said determining means determines that one of said plurality of dynamic programming values is below the predetermined threshold value.

5. A speech recognition apparatus according to claim 4, further comprising means for setting the predetermined threshold value.

6. A method for recognizing speech comprising the steps of:

converting a speech vector into data representing a time series of parameters;

calculating the cumulative distance P(i,j) between the $i^{th}$ frame of an input speech vector and the $j^{th}$ frame of the reference pattern, for calculating the optimal integral path length C(i,j) between the $i^{th}$ frame of the input speech vector and the $i^{th}$ frame of the reference pattern, and for calculating a dynamic programming value D(i) for the $i^{th}$ frame of an input speech vector according to the equation $D(i)=P(i,j)/C(i,j)$;

calculating sequentially the Mahalanobis distance between the data representing the time series of parameters and data representing a shifting reference pattern of a word comprising an average vector and a matrix including covariance elements obtained by learning some input speech vector of the word by performing a matching operation by means of a connected dynamic programming method;

detecting the minimum Mahalanobis distance; and recognizing when the end of a word has been input by determining that D(i) has fallen below a predetermined threshold and recognizing whether the speech vector converted in said converting step is the word represented by the reference pattern based on the minimum Mahalanobis distance detected in said detecting step when D(i) falls below the predetermined threshold.

7. A method according to claim 6, wherein said recognizing step comprises the steps of:

calculating a plurality of dynamic processing values over time of the spoken word converted in said converting step using the shifting standard pattern;

determining whether one of the plurality of dynamic programming values is below a predetermined threshold value; and recognizing the spoken word converted in said converting step as the word represented by the standard pattern when said one of the plurality of dynamic programming values is determined in said determining step to be below the predetermined threshold value.

8. A method according to claim 7, further comprising the step of setting the predetermined threshold value.

9. A method according to claim 6, wherein said calculation step comprises the step of calculating each of the plurality of distances by using a measure of the power of the spoken word converted in said converting step, the average vector of the spoken word converted in said converting step, and the matrix of the spoken word converted in the converting step.

10. A method for generating a reference pattern comprising the steps of:

performing dynamic programming matching of a plurality of input patterns, each of which being formed by pronouncing an identical word, with a kernel pattern identical to the word;

determining whether each frame of the input data corresponds to a frame constituting the kernel pattern in accordance with the result of the dynamic programming matching;

storing data of each frame determined to correspond to the frame of the kernel pattern; and generating a reference pattern for recognition by combining a plurality of the reference data of each frame obtained on the basis of a plurality of stored data determined to correspond to each frame of the kernel pattern.

11. A method for generating a reference pattern according to claim 10, wherein the reference pattern to be generated is composed of an average vector and a matrix including covariance elements.

12. An apparatus for generating a reference pattern comprising:

means for performing dynamic programming matching of a plurality of input patterns, each of which are formed by pronouncing an identical word with a kernel pattern identical to the word;

means for determining whether each frame of the input data corresponds to a frame constituting the kernel pattern in accordance with the result of the dynamic programming matching;

means for storing data of each frame determined to correspond to the frame of the kernel pattern; and means for generating a reference pattern for recognition by combining a plurality of the reference data of each frame obtained on the basis of a plurality of the stored data determined to correspond to each frame of the kernel pattern.

13. An apparatus for generating a reference pattern according to claim 12, wherein the reference pattern to be generated is composed of an average vector and a matrix including covariance elements.

14. A speech recognition apparatus, comprising:

input means for inputting a speech vector;

memory means for storing data representing a reference pattern of a word composed of an average vector and a matrix including covariance elements obtained by learning some input speech vector of the word;

calculation means for calculating sequentially the distance d(i,j) between data representing a time series of parameters of the speech vector input by said input means and data representing the reference pattern of the word composed of the average vector and the matrix including covariance elements stored in said memory means by performing a matching operation by means of a connected dynamic programming method, according to the equation $$d(i,j) = \lambda |y_i - \bar{y}_j| + (1-\lambda)(X_i - \bar{X}_j) S_j^{-1}(X_i - \bar{X}_j)^t$$

where $\lambda$ is the weight coefficient (0.0–1.0); $y_i$ is the power of the input speech vector in the $i^{th}$ frame thereof; $X_i$ is the input speech vector in the $i^{th}$ frame thereof; $\bar{X}_j$ is the average vector in the $j^{th}$ frame; $S_j$ is the matrix having covariance elements in the $j^{th}$ frame; and $\bar{y}_j$ is the average power in the $j^{th}$ frame;

detection means for detecting the reference pattern representing the minimum distance calculated by said calculation means; and recognition means for recognizing whether the input speech vector is the word represented by the reference pattern based on the data representing the minimum distance calculated by said calculation means and detected by said detection means.

15. A method for recognizing speech comprising the steps of:

converting an input speech vector into data representing a time series of parameters;

calculating sequentially the distance d(i,j) between data representing a time series of parameters of the speech vector and data representing a shifting reference pattern of a word composed of the average vector and the matrix including covariance elements obtained by learning some input speech vector of the word by performing a matching operation by means of a connected dynamic programming method, according to the equation $$d(i,j) = \lambda |y_i - \bar{y}_j| + (1-\lambda)(X_i - \bar{X}_j) S_j^{-1}(X_i - \bar{X}_j)^t$$

where $\lambda$ is the weight coefficient (0.0–1.0); $y_i$ is the power of the input speech vector in the $i^{th}$ frame thereof; $X_i$ is the input speech vector in the $i^{th}$ frame thereof; $\bar{X}_j$ is the average vector in the $j^{th}$ frame; $S_j$ is the matrix having covariance elements in the $j^{th}$ frame; and $\bar{y}_j$ is the average power in the $j^{th}$ frame;

detecting the minimum distance calculated in said calculating step; and recognizing whether the speech vector converted in said converting step is the word represented by the reference pattern based on the minimum distance detected in said detecting step.

* * * * *

UNITED STATES PATENT AND TRADEMARK OFFICE
CERTIFICATE OF CORRECTION

PATENT NO. : 5,751,898

DATED : May 12, 1998

INVENTORS : TETSUO KOSAKA, ET AL.

It is certified that error appears in the above-identified patent and that said Letters Patent is hereby corrected as shown below:

COVER PAGE

[56] References Cited

Other Publications, Page 2
"Rabiner, "Speaker-Independent Recognition of Isolated Words Using Clustering Techniques"" should read --Rabiner, et al., "Speaker-Independent Recognition of Isolated Words Using Clustering Techniques"--.

COLUMN 1,
Line 36, "ranobis" should read --lanobis--.

COLUMN 2,
Line 16, "Maharanobis" should read --Mahalanobis--.

Line 49, ""Maharanobis" should read --Mahalanobis--.

UNITED STATES PATENT AND TRADEMARK OFFICE
CERTIFICATE OF CORRECTION

PATENT NO. : 5,751,898

DATED : May 12, 1998

INVENTORS : TETSUO KOSAKA, ET AL.

Page 2 of 2

It is certified that error appears in the above-identified patent and that said Letters Patent is hereby corrected as shown below:

COLUMN 3,

Lines 60-63,

"P(i-2,j-1)+2d(i-1,j)+d(i,j)(a)" should read
--P(i-2,j-1)+2d(i-1,j)+d(i,j)...     (a)--.

"P(i-1,j-1)+2d(i,j)(b)" should read
--P(i-1,j-1)+2d(i,j)                  ...   (b)--.

"P(i-1mj-2)+2d(i,j-1)+d(i,j)(c)" should read
--P(i-1,j-2)+2d(i,j-1)+d(i,j)   ...   (c)--.

COLUMN 4,

Line 29, "according" should read --According--.

Signed and Sealed this

Sixteenth Day of November, 1999

Attest:

Q. TODD DICKINSON

*Attesting Officer*           *Acting Commissioner of Patents and Trademarks*